March 5, 1946.  C. WHITE  2,395,982
PALLET
Filed Sept. 25, 1944  2 Sheets-Sheet 1

INVENTOR.
C. WHITE.
BY Castberg & Roemer.
Attys.

March 5, 1946.　　　　C. WHITE　　　　2,395,982
PALLET
Filed Sept. 25, 1944　　　　2 Sheets-Sheet 2
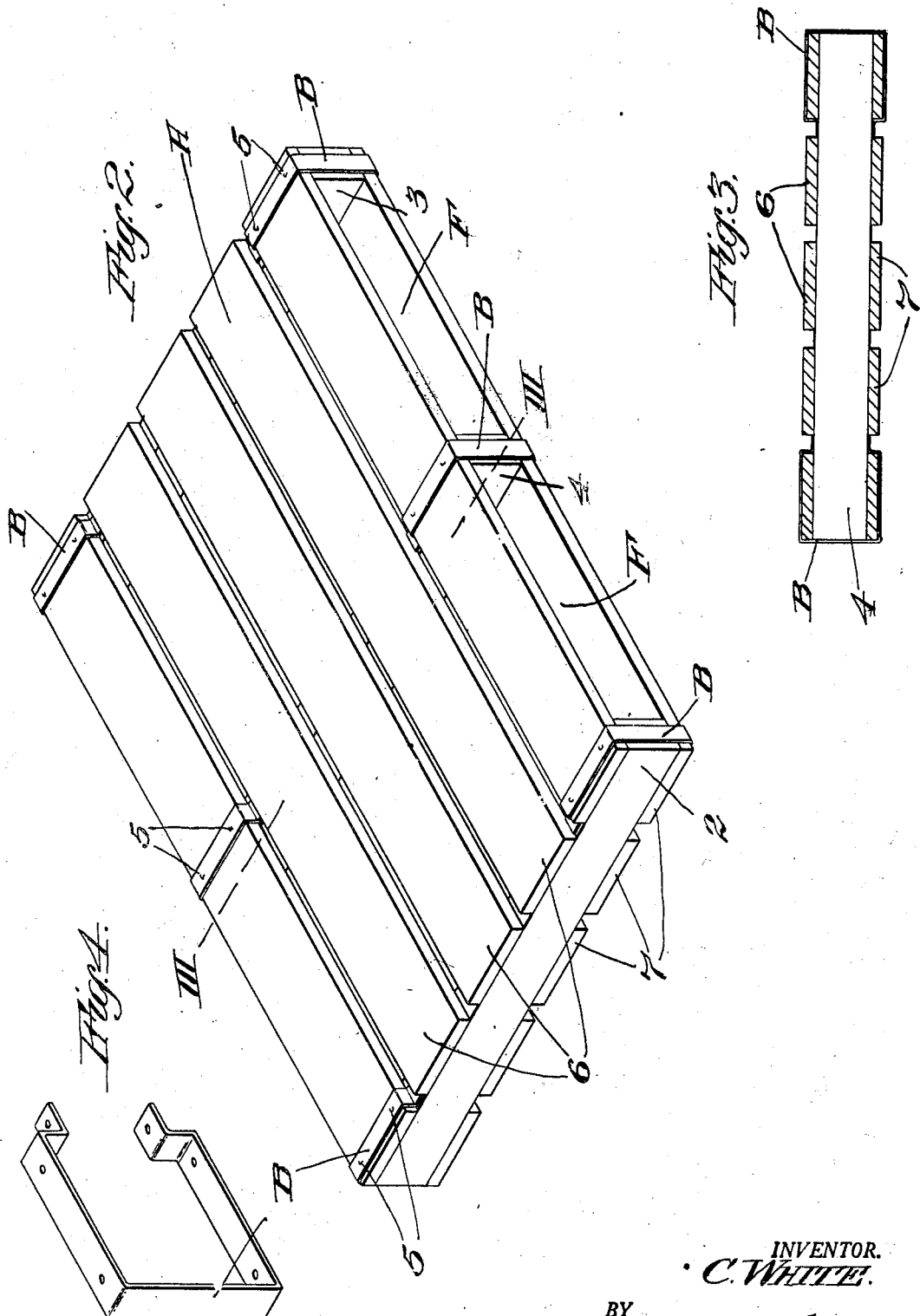
INVENTOR.
C. WHITE.
BY Castberg & Roemer
Attys.

Patented Mar. 5, 1946

2,395,982

UNITED STATES PATENT OFFICE 2,395,982

PALLET

Charles White, Alameda, Calif.

Application September 25, 1944, Serial No. 555,720

1 Claim. (Cl. 248—120)

This invention relates to pallets of the type employed in loading and unloading sacked or packaged goods such as sugar, flour, grains, coffee, etc., and especially to improvements in the construction of a pallet whereby damage to the goods and the pallet is materially reduced.

An enormous tonnage of sacked and packaged goods such as above referred to is handled by railroads, motor and water transport. For instance, sugar either in fabric or paper sacks or cartons are stacked on pallets directly at the refinery and are picked up by small power industrial trucks commonly known as jitneys which transfer the loaded pallets directly into a railway freight car, or places them on a barge or river steamer where they remain until reaching their destination. Here they are again picked up by a jitney and transferred to wharf or warehouse where they may be finally unloaded for delivery to the wholesaler, or otherwise. In other words by the use of pallets, it is only necessary to handle the individual sugar sacks or cartons two times—once when loading them on the pallets at the refinery, and second, when finally unloading them at the wharf or warehouse.

This pallet method of handling freight or goods of the character described has come into general use during the last few years as it saves time and labor, and in addition thereto has very materially reduced damage to and loss of goods. But even so, the pallets themselves are subject to wear and damage as they are constructed of wood which splinters, splits and breaks as they are subject to rough handling and heavy loads, and when they become damaged there may be projecting nails, screws or splinters which will tear or otherwise damage the sacked goods or cartons being handled. Hence, it is essential that the pallets are continuously inspected and maintained in repair as the damage to the goods handled will otherwise offset the advantages otherwise obtained.

The object of the present invention is generally to improve the construction and operation of the pallets and to such an extent that their useful life will be materially increased. The tendency to splinter, split and break will be materially reduced and damage to the goods handled proportionally decreased.

The improved pallet is shown by way of illustration in the accompanying drawings in which:

Fig. 2 is a perspective view of the pallet;

Fig. 3 is a longitudinal vertical section taken on line 3—3 of Fig. 2; and

Fig. 4 is a perspective view of one of the reenforcing iron straps.

Figure 1:
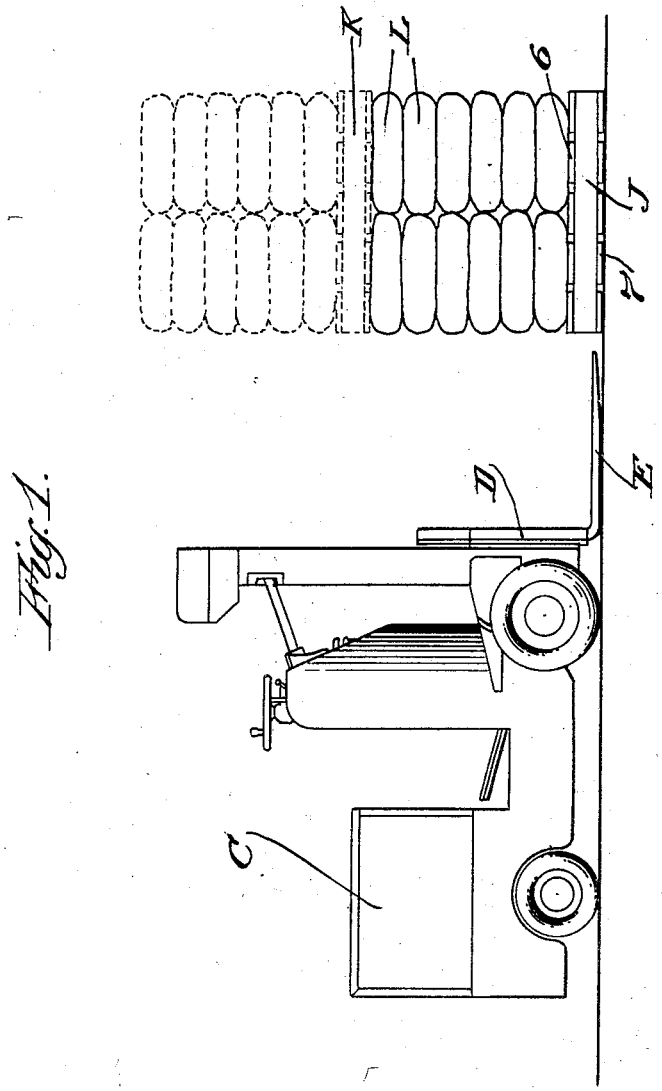
Fig. 1 is a side elevation of a jitney showing it in position to pick up a loaded pallet.

Referring to the drawings in detail, and particularly Figs. 2 and 3, A indicates in general the pallet forming the subject matter of the present application. The pallet is constructed of wood, to wit, three pieces of lumber, for instance three by fours, such as indicated at 2, 3 and 4. These pieces are parallel and spaced apart and are so arranged that there are two end pieces 2 and 3 and a center or intermediate piece 4. To the pieces thus arranged is nailed or secured by wood screws such as indicated at 5, top and bottom sets of planks generally indicated at 6 and 7, there being five bottom planks and five top planks which are spaced apart about one and one-half inches. In most instances, the planks range from one-half to one inch thickness, but they may be obviously increased or decreased both in thickness, length and width, depending upon the overall size of the pallet and the type of goods to be handled.

In addition to the lumber required to construct the pallet J, substantially U-shaped reenforcing steel or iron straps such as indicated at B are employed. These straps are placed one in each corner of the pallet as shown in Fig. 2, and one at each end of the center piece 4. The strap iron may, for instance, be one and one-half inches wide by three-sixteenths of an inch thick, and is held in place of the same nails or screws which secure the planks to the spacers or pieces 2, 3 and 4.

The reenforcing straps serve four main functions. First, that of reenforcing and strengthening the pallet as a whole; secondly, that of a protecting armor; third, that of spacers to maintain the planking of the pallet out of contact with the floor or the planking of a wharf or warehouse; and, fourth, that of sled runners which materially reduce friction and save the floors and pallet when pushed about from place to place.

In actual practice, the pallet may be forty-four inches long and sixty inches wide, this being an ideal size for handling sacked sugar. Pallets of this character are handled by power industrial trucks heretofore referred to as jitneys, and generally indicated at C in Fig. 1. The jitney is provided with a load-carrying and elevating device generally indicated at D which is provided with two forwardly projecting spaced-apart arms or forks E.

When a loaded pallet such as shown at J is to be picked up, the operator lowers the forks to a point where they will enter the spaces F—F (see Fig. 2) formed one on each side of the centerpiece 4, that is the spaces formed between the top and bottom planks of the pallet. When driving the truck forward to enter the forks in the spaces F—F, they may jab into the top or bottom planks or they may jab into the centerpiece 4 or one of the end pieces 2 and 3, and as such tend to split or splinter the same and cause nails or screw heads to become sufficiently exposed to cause tearing or cutting of sacked goods.

It is common practice to stack loaded pallets one on top of the other as shown in dotted lines at K (see Fig. 1). Consequently, when placing a loaded pallet or removing it from the dotted line position, if splinters, nails or screws project from the pallet, the top-most sacks indicated at L will tend to cut or tear with consequent loss of sugar, grain, etc.

The ordinary pallets wear and splinter when shoved over a rough warehouse floor, or the planking on a wharf, and when splinters are formed on the surface of the pallet, either the top or the bottom, as they are reversible, it obviously increases the chances of tearing the sacks.

A large proportion of damage to the pallets themselves and the goods handled is avoided by application of the reenforcing straps indicated at B, first because the pallets are reenforced and strengthened by their application, secondly, the straps function as sled runners, and they at the same time maintain the planking of the pallets sufficiently elevated with relation to the floor when the pallets are pushed about to prevent wear and splintering of the planking surfaces, and, third, the straps obviously serve as an armor which protects the ends of the pieces 2, 3 and 4 against splitting or breakage when the forks of the truck jab into them.

In view of the foregoing, it should be obvious that the useful life of the pallets themselves is materially increased. The cost of inspection and repair is reduced and damage and loss of the goods handled by the pallets is very materially reduced.

In the description of the pallet actual sizes of several of the parts employed have been specified, but it should be understood that this is by way of description and illustration only as the size of the pallets and the parts employed may obviously be increased or decreased depending upon the type and weight of goods to be handled, and while this and other features of the invention have been more or less specifically described, it should be understood that the materials and finish of the several parts employed may be changed to suit varying conditions and that other changes may be resorted to within the scope of the appended claim.

Having thus described my invention, what I claim and desire to secure by Letters Patent is:

A pallet of the character described comprising a plurality of spaced timbers one at each end of the pallet and one in the middle, a plurality of planks disposed cross-wise of the timbers and on opposite sides of them to form two supporting surfaces, means for securing the planks to the timbers, and a substantially U-shaped metal strap secured at each end of each spacing timber and extending over the surface of the adjacent planking of the pallet to form spacers and sled runners for the pallet, said means also forming an armor to reenforce and protect the planking and the ends of the spacing timbers against splitting and breakage.

CHARLES WHITE.